Aug. 7, 1945.   J. E. NEWMAN   2,381,076
GRASS DRYING APPARATUS
Filed Jan. 1, 1944   3 Sheets-Sheet 3
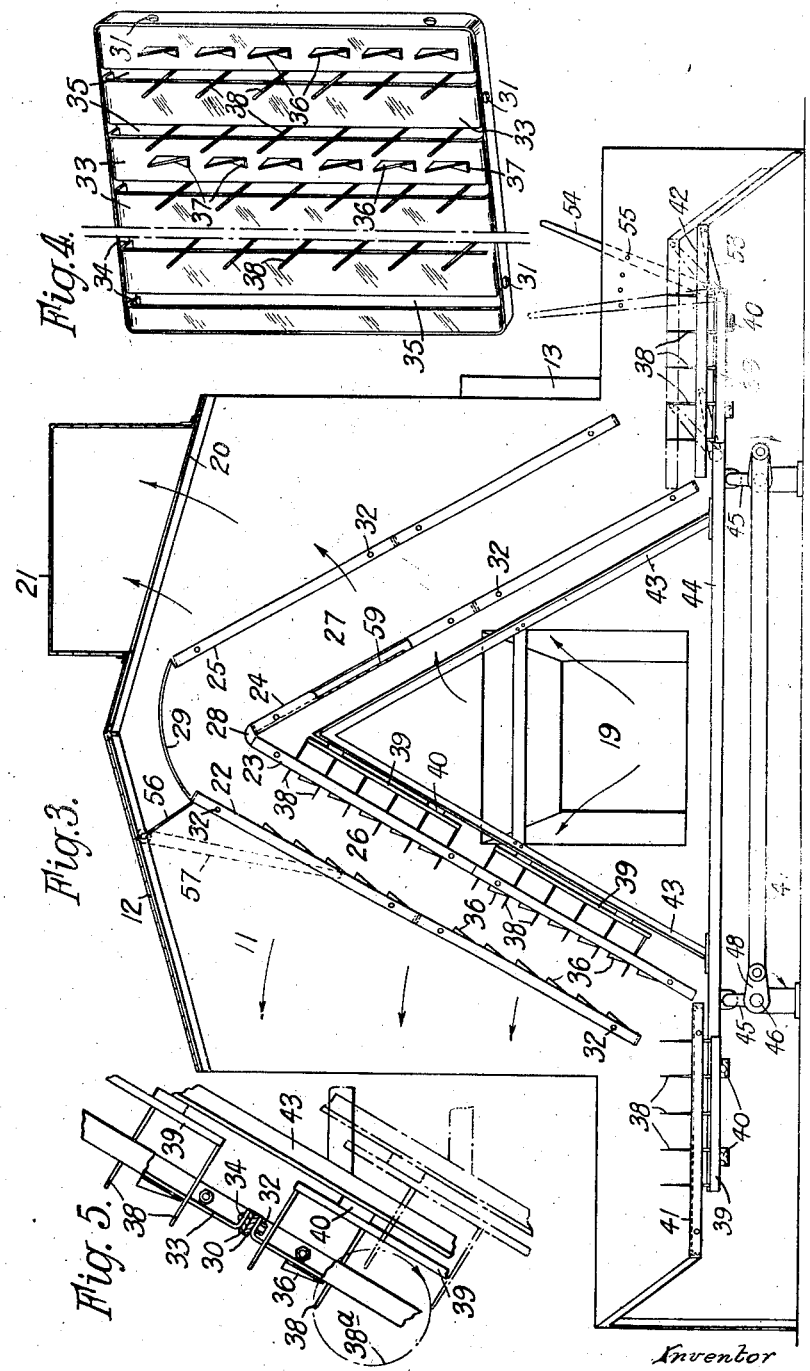
Inventor
JOHN ERNEST NEWMAN
BY
HIS ATTORNEY Patented Aug. 7, 1945

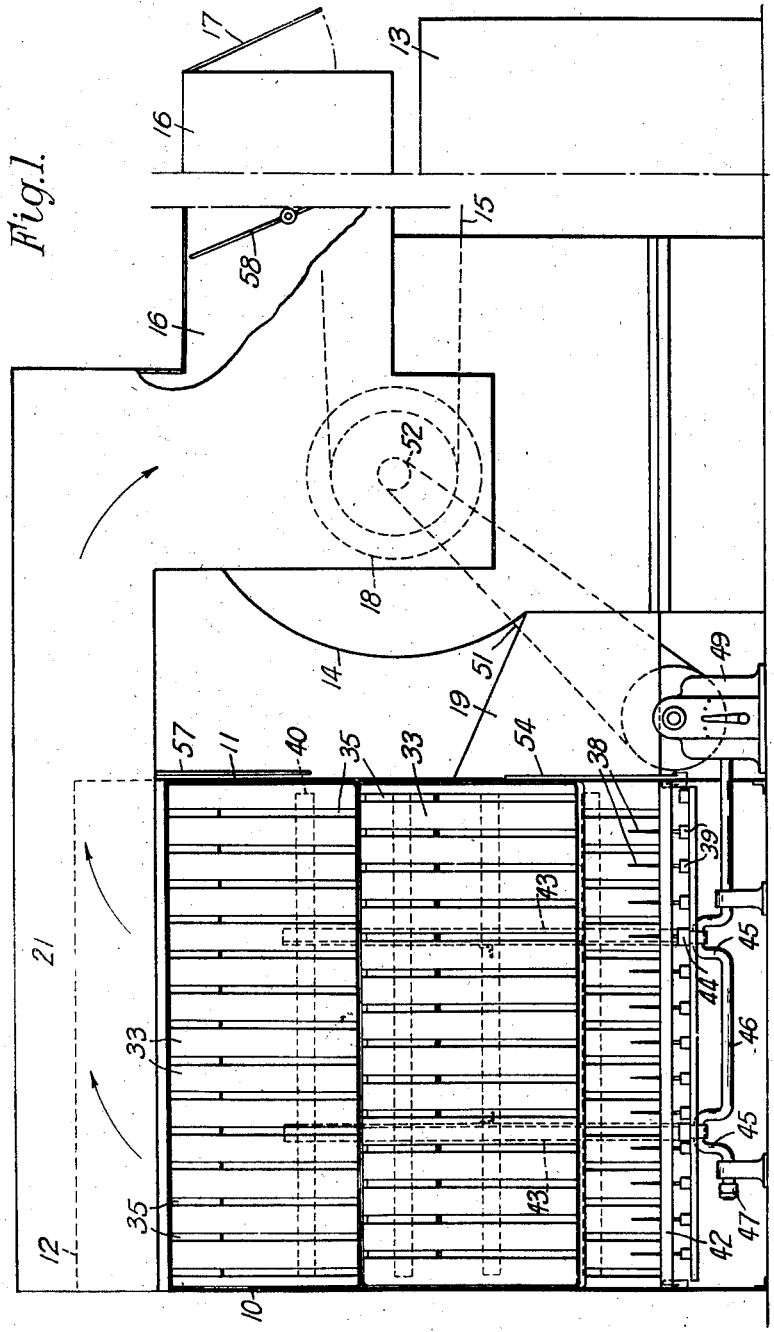

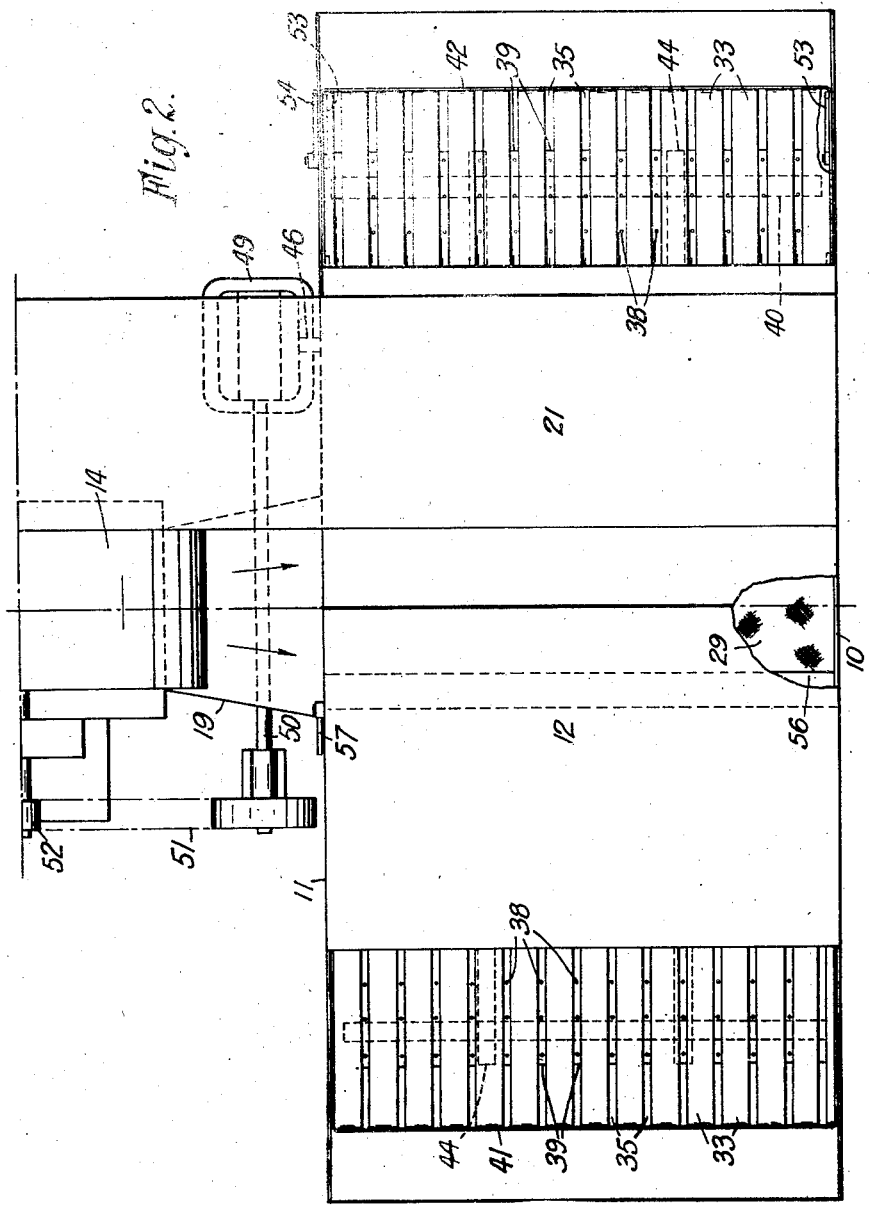

2,381,076

UNITED STATES PATENT OFFICE 2,381,076

GRASS DRYING APPARATUS

John Ernest Newman, Cirencester, England, assignor of two-thirds to Donald Stuart Kennedy, Andover, Hampshire, England Application January 1, 1944, Serial No. 516,607
In Great Britain November 20, 1942

12 Claims. (Cl. 34—206)

This invention relates to apparatus for drying grass by means of a gaseous drying medium such as hot air or flue gases from a furnace or other source; by the term "grass," as used in this specification and in the claims appended thereto, I mean to include meadow-grass or herbage and other agricultural products of a like nature, such as lucerne or alfalfa, clover and the like, as well as hemp, jute and flax. It is known that the nutritive value of grass, when allowed to grow to maturity and dried as hay, is far below that of the same grass when freshly cut, and that the protein-content of young grass cut in the early summer is higher than at any later stage of its growth; consequently, by cutting the young grass and drying it for storage until the winter, a very valuable fodder will be made available for feeding cattle at a season when they would otherwise be largely dependent upon hay, ensilage, and artificial feeding stuffs. The dried grass preserves its full nutritive value and retains certain accessory food factors (such as carotene) which are lacking in the fully grown and dried product.

The invention has for its main object to provide an improved grass drying apparatus in which hot air or other gaseous drying medium is blown into an enclosed space beneath an inclined plane or guide along which the grass is elevated by mechanical means, the drying medium flowing through slots or other apertures in the guide and then through the ascending mass of grass thereon.

Another object of the invention is to provide an improved drying apparatus of this kind, comprising two upwardly converging planes or guides, along which the grass ascends and descends respectively, with drying medium flowing through slots or other apertures in the two guides and then through the masses of grass travelling along them.

A further object is to provide mechanical means for conveying the grass to the bottom end of the inclined guide along which it is to be elevated, and for discharging the dried grass; the several means being operated by a common driving mechanism, with means for regulating the rate of discharge in relation to the rate of elevation.

Still another object of the invention is to provide an improved drying apparatus of the kind described, having means for re-circulating the drying medium which has passed through the already partly dried grass, this relatively dry medium being collected separately and led to the intake of the fan or other blowing means, for mixture with a fresh supply of drying medium from the furnace or the like.

Other objects and advantages of the invention will hereinafter appear from the following description of a preferred embodiment of the invention, given with reference to the accompanying drawings, in which—

Fig. 1 is an end elevation of the grass drying apparatus.

Fig. 2 is a partial plan view of the apparatus.

Fig. 3 is a side elevation with one of the walls removed.

Figs. 4 and 5 are details on a larger scale.

The apparatus illustrated comprises an open-ended casing formed by two side walls 10, 11, covered by a roof 12, a furnace 13, and a fan 14 which is driven by any suitable source of power, as by a belt 15 from an engine. Hot air from the furnace is passed along a duct 16, with or without admission of cold air through a hinged shutter 17, to the suction intake 18 of the fan, which forces the air through a discharge duct 19 to the interior of the casing. One end of the casing is freely open to the atmosphere, this being the left-hand end as viewed in Figs. 2 and 3; the other end may likewise be left open, as shown, the roof of the casing towards this end being apertured as indicated at 20 in Fig. 3 for connection with a duct 21 which joins the hot air duct 16 directly above the fan intake 18.

Within the casing, there are provided four inclined planes 22—25 defining two upwardly converging conduits 26, 27 for the ascent and the descent respectively of the grass to be dried by the effect of the hot air blown into the casing through the fan discharge duct 19; the latter delivers into the space between the conduits 26, 27 and beneath the inclined planes 23, 24, so that the air traversing the ascending grass in the conduit 26 can escape to the atmosphere through the open end of the casing, while the air traversing the descending grass in the other conduit 27 can either escape to the atmosphere or be drawn up into the duct 21 by the effect of the fan suction. The top ends of the inner inclined planes 23, 24, are joined by a spacer 28, and the top ends of the outer inclined planes are joined by a perforated plate 29 which allows escape of air but retains the grass.

The inclined planes 22—25 are preferably formed by pairs of grids having slots to allow passage of air between the adjacent parts in contact with the grass, one of these grids being shown on a larger scale in Fig. 4; each grid comprises a rectangular frame 30, of length equal to the distance between the walls 10, 11, and having bolt holes 31 whereby it can be secured to the other grid of the pair and to the walls of the casing, as by bolts 32, to form a rigid structure when assembled. Rectangular metal slats 33, having cranked extremities 34, are fitted in parallel relation between the top and bottom edges of each frame 30, the extremities being secured in place for example by welding; narrow slots 35 are thus left between adjacent slats in each frame to allow passage of air while the grass slides along the slats, and to accommodate the elevating or conveying devices mentioned hereinafter. The slats are preferably so disposed that the slots of a given pair are staggered as seen in Fig. 1; this may be arranged by making their pitch an aliquant part of the width of the grid, and setting up the two grids of a pair right and left-handed respectively. The grids forming the two inclined planes 22, 23 of the ascending conduit 26 may also be provided with means for retaining the grass so as to prevent it from sliding back down the conduit; for this purpose, the grids are shown fitted with triangular projections 36 acting as ratchet teeth, the projections being secured for example upon alternate slats of the grid by welding their cranked bases 37 to the surfaces of the slats.

Any suitable elevating or conveying devices may be employed for producing slow movement of the grass in the conduits. Preferably the slotted grids on the lower side of the ascending conduit 26 admit rows of spikes or prongs 38 mounted on parallel bars 39 which have a circular motion around axes lying transverse to and just below the conduit; the point of each spike 38 will also have a circular motion about a transverse axis lying approximately on the inner surface of the inclined plane, the circular path of one spike point being indicated at 38a in Fig. 5. During about one-half of the circular motion, the spikes will extend through the slots 35 to engage the material with a forward feeding action, but during the opposite phase of the motion the spikes will be withdrawn from the material while they return to their rearward position for the next forward movement; while the spikes are thus withdrawn, the grass will be prevented from sliding back by the retainers 36. The amplitude of the circular motion may be such that the spikes penetrate through about one-half of the depth or thickness of the travelling material, this thickness varying for example from 7 to 9 inches in the ascending conduit 26, which has an increasing depth towards its upper end, while the descending conduit may have a depth of about 12 inches and be mounted on links so that this depth can be varied.

The two inclined planes 23, 24 forming the lower sides of the conduits, are disposed as the sides of a triangle having its base just above the ground level; from the opposite ends of this base, feeder and discharge platforms 41, 42 extend horizontally, making obtuse angles with the lower ends of the inclined sides, these extensions or platforms each consisting of a single grid slotted longitudinally to admit rows of spikes or prongs 38 mounted on parallel bars 39 having a circular motion. These bars and the corresponding bars for the spikes of the inclined plane or lower side of the ascending conduit are secured by means of cross rails 40 upon a moving framework 43 of angular shape, the base 44 of which is carried by parallel cranks 45 upon horizontal shafts 46 extending transversely and geared together by a connecting rod 47 engaging a pair of cranks 48, set at 90° to the cranks 45. One of the shafts 46 is driven at a low variable speed by means of a gearbox 49, operated by a lay-shaft 50 to which motion is transmitted by a belt 51 from a small pulley 52 on the fan shaft.

Part of the hot air delivered through the fan discharge duct 19, between or under the conduits 26, 27, is able to pass beneath the platforms 41, 42, through which it escapes upwardly.

The fresh material unloaded upon the platform 41 at the feeder end is preferably levelled off to a suitable depth or thickness before introduction into the ascending conduit by the action of the spikes 38 operating in this platform; the levelling may be performed by hand, with the use of a fork or rake, thereby equalizing the thickness and ensuring that the material enters the conduit as an unbroken mass of uniform depth. During its travel up the first conduit, the material is maintained in a continuous intermittently moving stream by the action of the conveying devices; one advantage of this method of conveying is that while the grass is being elevated, its mass is being continually disturbed and subjected to a tedding action, which produces internal movement, so promoting easier and more even penetration by the hot air and breaking up any lumps or tangled masses of grass.

The retainers or ratchet-tooth projections 36 check by their shape any tendency of the grass to slip back while the spikes are on their idle return stroke, and they also assist the tedding action. The slope of the inclined plane, combined with the pressure of the issuing air, considerably reduces the weight carried by the inclined plane and the sliding friction of the grass; the upper inclined plane 25 on the descending side may however be arranged movably on parallel links, so as to vary the depth and consequently the time which the material spends in the conduit 27 before passing onto the discharge platform 42.

In order to regulate the speed of discharge in relation to the drying capacity of the apparatus, means may be provided for raising or lowering the discharge platform to vary the length of the spikes projecting above this platform. As best seen in Fig. 3, the platform 42 is mounted upon parallel links 53 controlled by a lever 54 which can be thrown over by hand to raise the platform to any desired extent above its normal low position, the lever being then locked in adjusted position by a pin 55; the effective throw of the spikes can thus be reduced to any desired fraction of their full stroke.

During operation, the hot air traversing the wet mass of grass on the feeding platform 41 and in the ascending conduit 26 will be exhausted to the atmosphere directly or through the open end of the casing, but the relatively dry air which has traversed the partly dried grass in the descending conduit 27 will be drawn up into the duct 21 and returned to the fan for recirculation, and the air which has traversed the dried grass on the discharge platform 42 may likewise be drawn up into the duct 21 for recirculation. An adjustable division plate 56, hinged across the top of the casing and controlled by an external handle 57, normally separates the air which is to be exhausted from that which is to be recirculated and prevents the fan suction from drawing in excessively humid air; under favorable conditions, however, the division plate 56 may be shifted to allow a portion of the air which has traversed the top of the ascending conduit to join the air for recirculation. By making the recirculation duct 21 of ample size, it may be utilized for admitting the main air supply to the fan, including both the hot air which is being recirculated and atmospheric air entering at the open end of the casing above the discharge platform 42; a throttle valve 58 is shown in the hot air duct 16 between the furnace and the fan to allow the necessary suction to be imposed on the duct 21 under these conditions, and a dead plate 59 may be provided beneath part of the uppermost grid of the descending conduit, as shown in Fig. 3, in order to prevent the hot air from escaping through gaps in the mass at this position and to allow of stopping the discharge for a short interval without the necessity of stopping the feed.

It will be understood that the throughput of the drying apparatus will be determined by the rate at which the crankshafts of the conveying devices rotate; the variable speed gearbox provided will allow of varying this rate according to the moisture content of the grass being dried, the time of passage through the casing being variable for example from 8 to 32 minutes for this purpose. The grass delivered to the discharge platform may be allowed to stand for a short period before removal, in order to complete its drying.

The drying apparatus may evidently be employed for other agricultural products of a like nature to grass or for drying hemp, jute and flax.

What I claim is:

1. Grass drying apparatus, comprising two upwardly converging conduits, mechanical means for elevating grass through one of said conduits for descent from the upper end thereof through the other of said conduits, and means for blowing a gaseous drying medium beneath said conduits for passage transversely through said conduits and through the grass travelling along the respective conduits, each of said conduits including apertures for transverse passage of the drying medium, and said mechanical elevating means operating through said apertures in said one conduit.

2. Grass drying apparatus, comprising an inclined guide for upward sliding movement of a mass of grass, a feed platform adjacent to the lower end of said guide, mechanical means for conveying grass over said feed platform, co-operating means for elevating said grass along said guide, and means for blowing a gaseous drying medium beneath said guide and through the grass thereon, said guide including apertures for passage of the drying medium, said feed platform also including apertures, and said conveying and elevating means including spikes operating through said apertures in said inclined guide and in said feed platform.

3. Grass drying apparatus, comprising an inclined guide for upward sliding movement of a mass of grass, a feed platform adjacent to the lower end of said guide, mechanical means for conveying grass over said feed platform, co-operating means for elevating said grass along said guide, a second guide for grass descending from the upper end of said inclined guide, a delivery platform adjacent to the lower end of said second guide, mechanical means for conveying grass over said delivery platform, and means for blowing a gaseous drying medium between said guides for passage through the upwardly sliding grass, said inclined guide including apertures for passage of the drying medium, said platforms also including apertures, and said conveying and elevating means operating through said apertures in said inclined guide and in said platforms.

4. Grass drying apparatus, comprising an inclined guide for upward sliding movement of a mass of grass, a feed platform adjacent to the lower end of said guide, mechanical means for conveying grass over said feed platform, co-operating means for elevating said grass along said guide, a second guide for grass descending from the upper end of said inclined guide, a delivery platform adjacent to the lower end of said second guide, mechanical means for conveying grass over said delivery platform, and means for blowing a gaseous drying medium between said guides and beneath at least one of said platforms for passage through the grass thereon, each of said guides and at least said one platform being apertured for passage of the drying medium.

5. Grass drying apparatus, comprising an inclined guide for upward sliding movement of a mass of grass, said guide including a plurality of slats extending longitudinally of the guide and spaced apart to provide parallel slots, mechanical means for elevating grass along said guide, said elevating means including rows of spikes extending through said slots and driving means having a circular orbital motion to carry said spikes partly through the grass while moving upwardly along said slots, a second inclined guide for grass descending from the upper end of the first-mentioned guide, said second guide including a plurality of slats extending longitudinally of said second guide and spaced apart to provide parallel slots, and means for blowing a gaseous drying medium beneath said guides for passage by way of said slots through grass travelling along the respective guides.

6. Grass drying apparatus, comprising an inclined guide for upward sliding movement of a mass of grass, mechanical means for elevating grass along said guide, a second inclined guide for grass descending from the upper end of said first-mentioned guide, said guides consisting of grids with longitudinally extending slots, an open-ended casing formed by two walls and a roof, said grids being secured as spacers between the walls of said casing, and means for blowing a gaseous drying medium into said casing and beneath said guides for passage by way of said slots through grass respectively being elevated along said first-mentioned guide and descending along said second guide, the drying medium from above the first-mentioned guide escaping to the atmosphere through the adjacent open end of said casing.

7. Grass drying apparatus, comprising an inclined apertured guide for upward sliding movement of a mass of grass, mechanical means for elevating grass along said guide, a second apertured guide for grass descending from the upper end of said inclined guide, a casing for said guides, means for blowing a gaseous drying medium into said casing and beneath said guides for passage through the apertures therein and through the grass thereon, the drying medium which has passed through the grass on the inclined guide escaping to the atmosphere through an opening of said casing, and means for collecting the drying medium which has passed through the descending grass for recirculation through said blowing means into said casing and beneath said guides.

8. Grass drying apparatus, comprising an inclined apertured guide for upward sliding movement of a mass of grass, an apertured feed platform adjacent to the lower end of said guide, mechanical means for conveying grass over said feed platform, co-operating means for elevating said grass along said guide, a second guide for grass descending from the upper end of said inclined guide, an apertured delivery platform adjacent to the lower end of said second guide, mechanical means for conveying grass over said delivery platform, means for regulating the position of said delivery platform in relation to the last-mentioned conveying means to determine the rate of delivery, and means for blowing a gaseous drying medium between said guides and beneath said platforms for passage through the grass travelling along said inclined guide and over said platforms.

9. Grass drying apparatus, comprising an inclined guide for upward sliding movement of a mass of grass, a feed platform adjacent to the lower end of said guide, mechanical means for conveying grass over said feed platform, co-operating means for elevating said grass along said guide, a second guide for grass descending from the upper end of said inclined guide, a delivery platform adjacent to the lower end of said second guide, apertures in said inclined guide and in said platforms, mechanical means for conveying grass over said delivery platform, said elevating and conveying means including a rigid frame extending adjacent to said guides and platforms, spikes secured to said frame and adapted to extend through said apertures in said inclined guide and platforms, means for imparting a circular orbital motion to said frame, and means for blowing a gaseous drying medium between said guides and beneath said platforms for passage through the grass travelling along said inclined guide and over said platforms.

10. Grass drying apparatus, comprising two upwardly converging guides, one of said guides including apertures, said apertured guide being inclined for upward sliding movement of a mass of grass, mechanical means for elevating grass along said inclined guide for descent from the upper end thereof in proximity to the other of said guides, a feed platform adjacent to the lower end of said inclined guide, a delivery platform adjacent to the lower end of the other of said guides, both of said platforms including apertures, mechanical means for conveying grass over said platforms, said mechanical means including a rigid frame extending adjacent to said guides and platforms, spikes secured to said frame and adapted to extend through said apertures in said inclined guide and platforms, a pair of crankshafts having their cranks set in parallel planes, said rigid frame having its base journaled upon said cranks, means for imparting a rotary motion to said crankshafts, and means for blowing a gaseous drying medium between said guides for passage through said apertures in said inclined guide and through the ascending grass.

11. Grass drying apparatus, comprising an inclined guide for upward sliding movement of a mass of grass, mechanical means for elevating grass along said inclined guide for descent from the upper end thereof, a feed platform adjacent to the lower end of said inclined guide, mechanical means for conveying grass over said feed platform, said inclined guide and said feed platform including apertures, said mechanical means including a rigid frame extending adjacent to said inclined guide and feed platform, spikes secured to said frame and adapted to extend through said apertures in said inclined guide and feed platform, a pair of crankshafts having their cranks set in parallel planes, said rigid frame including bearings upon said cranks, means for imparting a rotary motion to said crankshafts, and means for blowing a gaseous drying medium beneath said inclined guide for passage through said apertures therein and through the ascending grass.

12. Grass drying apparatus, comprising an inclined guide for upward sliding movement of a mass of grass, a feed platform adjacent to the lower end of said guide, mechanical means for conveying grass over said platform and upwardly along said guide, said guide and platform including apertures, said mechanical means including spikes adapted to extend through said apertures, a frame, said spikes being secured to said frame, and driving means imparting a circular orbital motion to said frame for carrying said spikes upwardly through said apertures and partly through the grass upon said platform and guide while moving in a direction towards the upper end of said guide, said spikes being withdrawn from the grass upon said platform and guide while moving in a direction away from the upper end of said guide, and means for blowing a gaseous drying medium beneath said guide for passage through said apertures therein and through the ascending grass.

JOHN ERNEST NEWMAN.